UNITED STATES PATENT OFFICE.

BYRON B. GOLDSMITH, OF NEW YORK, N. Y.

COMPOSITION OF MATTER.

1,228,428.                  Specification of Letters Patent.      Patented June 5, 1917.

No Drawing. Original application filed January 10, 1913, Serial No. 741,158. Patent No. 1,168,626, reissued as Patent No. 14,087. Divided and this application filed August 4, 1915. Serial No. 43,542.

*To all whom it may concern:*

Be it known that I, BYRON B. GOLDSMITH, a citizen of the United States, residing at New York, in the county of New York and State of New York, have invented certain new and useful Improvements in Compositions of Matter; and I do hereby declare the following to be a full, clear, and exact description of the invention, such as will enable others skilled in the art to which it appertains to make and use the same.

My invention relates to a certain composition of matter which may be used either for molding into shapes or dissolving in an appropriate solvent as a coating or varnish. I have discovered that on heating together a phenol with the formaldehyde compound of an amin, a reaction takes place with the formation of useful products varying among themselves according to the particular phenol and amin employed. As an example: I can take ordinary phenol $C_6H_5OH$ and heat it with anhydroformaldehydeanilin. There is produced a soft resinous mass, which becomes progressively harder on further heating. Instead of using phenol and anhydroformaldehydeanilin in their natural state they can be used in solution, and by heating such solutions a condensation product can be formed. The reaction between phenol and anhydroformaldehydeanilin seems to start before heat is applied, as even in the cold if phenol is added to anhydroformaldehydeanilin, which is a solid, the entire mass liquefies. Anilin is liberated during the reaction and this can, if desired, be entirely or partly removed by suitable means at the proper stage, thus giving a harder resin. No special apparatus need be used to bring about the reaction as it takes place by heating in an open vessel.

The compound can be dissolved in proper solvents, such as acetone, and used for varnish. The proportions in which the ingredients are mixed will vary according to the particular phenol and other ingredient used, and the most suitable proportion for each case can be best determined by experiment.

I have found that a compound having the qualities specified may be readily produced by heating together one part, by molecular weight, of carbolic acid with one part, by molecular weight, of (for instance) anhydroformaldehydeanilin. The proportions are based upon the formula for anhydroformaldehyde-anilin given as $C_6H_5N=CH_2$ in the work of Dr. Hugo Erdman entitled *Anleitung Zur Darstellung Organischer Chemischer Preparate*, 1894, page 126. If the formula be assumed as $(C_6H_5N=CH_2)_3$, then one molecular weight of anhydroformaldehydeanilin should be used with three molecular weights of phenol.

This reaction can be carried out with the formaldehyde compounds of the amins of the fatty as well as the aromatic series. Methyl amin and anilin are the first members of each series. The formaldehyde compound of methyl amin is methyl-methylene amin and the formaldehyde compound of anilin is anhydro-formaldehyde-anilin. I have chosen these two amins as examples to show that notwithstanding the great difference between them, methyl amin being a gas and anilin a liquid, the formaldehyde compound of each is suitable for the reaction. In the same manner I can use the formaldehyde compound of other amins such as ethyl amin, propyl amin, toluidin, xylidin, etc.

It is to be understood that in the claims wherever a phenol is called for, the expression is intended to cover not only ordinary phenol, but other phenols such as guaiacol, resorcin, alpha and beta naphthol, pyrogallol, and in fact any compound of this character which has the property of uniting with the methylene group of the compound formed by reacting upon an amin with formaldehyde. On heating the compounds formed as above described they become harder and more insoluble, and they are well adapted for molding under heat and pressure, with or without the admixture of other substances, as is well understood in the art, and in fact they can be put to all the uses which such substances have been found adapted to.

As mentioned above, any amin which is liberated during the reaction can be partly or entirely removed at the proper stage, and it is sometimes desirable to remove it and sometimes not, depending upon the properties desired in the final product. It will be understood that, where the amin component of the formaldehyde compound used is not readily volatile, the transformation of the resinous compound first formed when it is further heated will not be accompanied by formation of a readily volatile by-product of the reaction.

The process herein described is claimed in U. S. Reissued Patent No. 14,087, dated March 14th, 1916, and this application is a division of that upon which was granted the original process Patent No. 1168626, reissued as aforesaid.

What I claim is:

1. The compound produced by heating together a phenol and a definite compound of formaldehyde and an amin, said compound having the physical characters of a resin and being soluble in acetone.

2. The compound produced by heating together carbolic acid and a definite compound of formaldehyde and an amin, said compound having the physical characters of a resin and being soluble in acetone.

3. The compound produced by heating together carbolic acid and anhydroformaldehyde anilin, said compound having the physical characters of a resin and being soluble in acetone.

4. As a new composition of matter, the product of reaction between a phenolic body and anhydro-formaldehyde-anilin, said product being characterized by its capability of transformation by heat into a hard, homogeneous, non-porous product without formation of a readily volatile by-product of the reaction.

5. As a new composition of matter, the product of reaction between a fusible phenolic resin and anhydro-formaldehyde-anilin, said product being characterized by its initial fusibility and its transformation by heat into a hard, homogeneous, non-porous product without formation of a readily volatile by-product of the reaction.

In testimony whereof, I have affixed my signature hereto.

BYRON B. GOLDSMITH.